United States Patent [19]
Beylin et al.

[11] Patent Number: 6,148,302
[45] Date of Patent: Nov. 14, 2000

[54] METHOD, APPARATUS, SYSTEM AND COMPUTER PROGRAM PRODUCT FOR INITIALIZING A DATA STRUCTURE AT ITS FIRST ACTIVE USE

[75] Inventors: Boris Beylin, Palo Alto; Vinod Grover, Piedmont, both of Calif.

[73] Assignee: Sun Microsystems, Inc., Palo Alto, Calif.

[21] Appl. No.: 09/031,229

[22] Filed: Feb. 26, 1998

[51] Int. Cl.[7] ............................... G06F 7/00; G06F 12/00
[52] U.S. Cl. .......................... 707/102; 707/100; 707/102; 707/103; 707/104; 707/101; 711/201
[58] Field of Search .................................. 707/100, 102, 707/103, 104; 711/201

[56] References Cited

U.S. PATENT DOCUMENTS

| | | | |
|---|---|---|---|
| 5,201,043 | 4/1993 | Crawford et al. | 395/575 |
| 5,421,016 | 5/1995 | Conner et al. | 395/700 |
| 5,771,382 | 6/1998 | Wang et al. | 365/670 |
| 5,819,252 | 10/1998 | Benson et al. | 707/1 |
| 5,852,731 | 12/1998 | Wang et al. | 395/670 |
| 5,884,083 | 3/1999 | Royce et al. | 395/705 |
| 5,995,753 | 11/1999 | Walker | 707/102 |
| 6,003,038 | 12/1999 | Chen | 707/103 |

OTHER PUBLICATIONS

Gosling, J., et al., "Execution," in The Java™ Language Specification, Addison–Wesley, Menlo Park, California, pp. 223–227 (1996).

Van der Linden, P., "Object–Oriented Programming," in *Not Just Java*, Prentice Hall PTC, Upper Saddle River, NJ, pp. 136–149 (1997).

*Primary Examiner*—Eddie P. Chan
*Assistant Examiner*—Kimberly McLean
*Attorney, Agent, or Firm*—Robert P. Sabath; Stanley N. Protigal

[57] ABSTRACT

Apparatus, methods, systems and computer program products are disclosed that provide an efficient mechanism for invoking a programmed operation at the first active use of the OOP object or data structure. The programmed operation can be used to initialize an object-oriented programming (OOP) object or data structure. The first active use of the data structure or OOP object is detected because the initial access mechanism is constrained to cause a misaligned memory access fault (trap) by attempting a non-byte access-mode memory access to an odd byte address. As the fault is processed, the access mechanism is converted so that the initial and subsequent non-byte access-mode memory accesses will succeed. In addition, the OOP object or data structure is initialized. Then the initial access attempt is repeated on the just initialized OOP object or data structure using the converted access mechanism. The use of the invention improves the performance of computers by reducing the overhead involved with particular computational operations.

32 Claims, 8 Drawing Sheets

METHOD, APPARATUS, SYSTEM AND COMPUTER PROGRAM PRODUCT FOR INITIALIZING A DATA STRUCTURE AT ITS FIRST ACTIVE USE

BACKGROUND OF THE INVENTION

1. Field of the Invention

This invention relates to the field of data structure initialization techniques. Specifically, this invention is a method, apparatus, system and computer program product for efficiently invoking a programmed operation at the first active use of a data structure or class object. The programmed operation can be used, without limitation, to initialize the data structure or static variables in the class object.

2. Background

A computer's central processing unit (CPU) is designed to execute computer instructions that perform operations on data-values. These data-values are generally stored in variables in memory and in the CPU's registers. Most general purpose computers have specialized instructions for accessing variables having different lengths. For example, a byte-oriented memory-access mode will access a single byte of memory at any byte addressable address in memory. Other non-byte access-modes are used to access two, four, eight, sixteen byte or other sized variables. Each of the non-byte access-modes requires that the variable be aligned on an even memory address. The computer raises a fault condition (a misaligned memory access fault) if a non-byte access-mode is attempted to an odd byte address. This fault condition causes an exception in the computer system and invokes a trap.

Data structures are used to organize information stored in a computer system. Programmed-routines, in a procedural programming paradigm, access the data structures to perform operations dependent on, and/or to modify the contents of, the data structures. These data structures are initialized after they are allocated. The order in which these data structures are initialized is important especially when the initial state of one data structure depends on the state of another data structure. One skilled in the art will understand that the data structure may be pre-initialized by the allocation process to set data fields within the data structure to some default value (usually zero). This pre-initialization is different from the initialization required to set particular data structure elements to initial non-default values.

Object-oriented programming (OOP) languages encapsulate an object's data (generally contained in the object as a data structure) with associated OOP methods for operating on that object's data. Usually, OOP objects are instantiated in a heap memory area and are based on classes that reference the programmed methods for each OOP object. Instantiated OOP objects are accessed through pointers and contain data (in instance variables) specific to that particular instantiated OOP object. Conceptually, an OOP object contains object-related information (such as the number of instance variables in the object), the instance variables, and addresses of programmed routines (OOP methods) that access and/or manipulate the contents of the instance variables in the object. However, because objects often share programmed routines and object-related information, this shared information is usually extracted into a class. Thus, the instantiated object simply contains its own instance variables and a pointer to its class.

The invention applies to both data structures and OOP objects (such as class objects).

Smalltalk, Java and C++ are examples of OOP languages. Smalltalk was developed in the Learning Research Group at Xerox's Palo Alto Research Center (PARC) in the early 1970s. C++ was developed by Bjarne Stroustrup at the AT&T Bell Laboratories in 1983 as an extension of C. Java is an OOP language with elements from C and C++ and includes highly tuned libraries for the internet environment. It was developed at SUN Microsystems and released in 1995.

Further information about OOP concepts may be found in *Not Just Java* by Peter van der Linden, © Sun Microsystems Press/Prentice Hall PTR Corp., Upper Saddle River, N.J., (1997), ISBN 0-13-864638-4, pages 136–149 which is incorporated herein by reference.

Some OOP languages (such as the JAVA programming language) allow class variables. These class variables allow each instantiated object to access a common instance variable shared by each instantiated object that depends on the class. The static class variables must be initialized prior to their use by any of the instantiated objects. The Java programming language specification requires static class variables to be initialized at the first active use of the class. Further information about initialization of Java classes may be found in *The Java™ Language Specification* by Gosling, Joy, and Steele, © Sun Microsystems, Inc., Addison-Wesley, ISBN 0-201-63451-1, pages 223–227 which is incorporated herein by reference.

FIG. 1A illustrates a class object data structure, indicated by general reference character 100, that illustrates a data structure used as an OOP class object. The class object data structure 100 includes a 'status' field 101 that contains, among other information, the initialization state of the class object. The class object data structure 100 also includes a 'static class variable' field 103 used to store the contents of the static class instance variable. The class object data structure 100 also includes a 'class method pointer' field 105 that contains an access mechanism to the class' methods such as an array of pointers to these methods.

FIG. 1B illustrates a prior art 'data structure access' process, indicated by general reference character 120, used to initialize a data structure at its first active use. The prior art process 120 initiates at a 'start' terminal 121 and continues to a 'data structure initialized' decision procedure 123 that checks the 'status' field 101 of the data structure to determine whether the data structure has been initialized. If the data structure has not been initialized, the prior art process 120 continues to an 'initialize data structure' procedure 125 that performs the initialization and modifies the contents of the 'status' field 101 to indicate that the data structure has been initialized. Once the 'initialize data structure' procedure 125 completes, or if the 'data structure initialized' decision procedure 123 determined that the data structure has already been initialized, the prior art process 120 continues to an 'access data structure' procedure 127 that performs an active use of the data structure. The prior art process 120 completes through an 'end' terminal 129.

The major disadvantage of this prior art approach is that every access to a data structure element in the data structure requires that the computer check whether the data structure has been initialized. Compiler optimization technology exists to optimize out redundant checks by exploiting the fact that only successful checks reach other checks within a routine. In addition, computationally expensive inter-routine analysis can be used to optimize out redundant checks across routine boundaries assuming that the execution sequence can be determined. However, these compiler optimization techniques are computationally very expensive and as a result are often not used.

FIG. 1C illustrates a prior art 'adaptive optimization' process, indicated by general reference character 150, for self modifying the executing program code to optimize access to the data structure elements. Using this method, the compiler generates code to invoke an access check routine instead of computer operations to directly access the data structure element. As each access check is encountered, the call-site used to invoke the access check routine is modified to overwrite the invocation of the access check routine with instructions for directly accessing the data structure element. In addition, the access check routine initializes the data structure the first time the access check routine is called on the data structure.

The optimization process 150 initiates at a 'start' terminal 151 and continues to an 'invoke access check routine' procedure 153. The 'invoke access check routine' procedure 153 occurs from the call site at the point where the program would normally access the data structure element. The access check routine, at a 'first data structure access' decision procedure 155, then evaluates the 'status' field 101 to determine whether the class object data structure 100 has been initialized. If the data structure has not been initialized, the access check routine performs the required initialization at an 'initialize data structure' procedure 157. Next, the optimization process 150 continues to a 'patch runtime call site' procedure 159. The 'patch runtime call site' procedure 159 modifies the computer instructions at the call site to replace the invocation instructions for the access check routine with instructions that actually access the data structure elements in the class object data structure 100 and thus optimize subsequent processing. Generally the 'patch runtime call site' procedure 159 also patches other call sites that access the data structure so that only one invocation of the 'invoke access check routine' procedure 153 is needed for each data structure.

However, if the class object data structure 100 has already been initialized (or when the 'patch runtime call site' procedure 159 completes) the optimization process 150 continues to an 'access data structure' procedure 161 (defined by the inserted instructions) that accesses the desired data structure element. Then the optimization process 150 completes through an 'end' terminal 163.

The major disadvantage with this prior art method is that the executable program code is self modifying. This solution is not acceptable in many environments. Self modifying code is also very difficult to debug and maintain.

It would be advantageous to provide a technique for a first active use initialization of data structures that does not self-modify executing code nor require special case compiler optimizations and is more efficient than the prior art techniques. Such an inventive technique would improve the performance of computers that use the technique.

SUMMARY OF THE INVENTION

The present invention is a technique for invoking a programmed operation in response to a first active use of an area of memory.

One aspect of the invention is a method for invoking a programmed operation on a data structure responsive to a first active use of the data structure. The method includes the step of associating a data structure access tag storage with the data structure. The data structure access tag storage initially contains a misaligned memory address related to the data structure. Another step is that of triggering a trap on the first active use of the data structure by attempting to access the data structure using the misaligned memory address with an aligned memory access-mode. The invention also includes the step of converting the misaligned memory address within the data structure access tag storage to a aligned memory address. Thus, subsequent attempts to access the data structure using the aligned memory access-mode and contents of the data structure access tag storage will succeed without triggering the trap.

Another aspect of the invention discloses a system for invoking a programmed operation on a data structure responsive to a first active use of the data structure. The invention includes an association mechanism that is configured to associate a data structure access tag storage with the data structure. The data structure access tag storage initially contains a misaligned memory address related to the data structure. The invention also includes a misaligned memory access error mechanism that is configured to trigger a trap on the first active use of the data structure. The first active use of the data structure is by an attempt to access the data structure using a aligned memory access-mode with the misaligned memory address associated with the data structure by the association mechanism. Another element of the invention is an address conversion mechanism that is configured to convert the misaligned memory address within the data structure access tag storage to an aligned memory address. This mechanism is responsive to the misaligned memory access error mechanism. Thus, subsequent attempts to access the data structure using the aligned memory access-mode and contents of the data structure access tag storage will succeed without triggering the trap.

Yet another aspect of the invention is an apparatus for invoking a programmed operation on a data structure responsive to a first active use of the data structure. The apparatus includes an association mechanism configured to associate a data structure access tag storage with the data structure. The data structure access tag storage initially contains a misaligned memory address related to the data structure. The invention also includes a misaligned memory access error mechanism that is configured to trigger a trap on the first active use of the data structure. This mechanism is triggered by an attempt to access the data structure using a aligned memory access-mode with the misaligned memory address associated with the data structure by the association mechanism. Still another element of the invention is an address conversion mechanism that is configured to convert the misaligned memory address within the data structure access tag storage to an aligned memory address. This mechanism is responsive to the misaligned memory access error mechanism. Thus, subsequent attempts to access the data structure using the aligned memory access-mode and contents of the data structure access tag storage will succeed without triggering the trap.

Yet a further aspect of the invention is a computer program product embodied on a computer usable storage medium for invoking a programmed operation on a data structure responsive to a first active use of the data structure. When executed on a computer, the computer readable code causes a computer to effect an association mechanism, a misaligned memory access error mechanism and an address conversion mechanism. Each of these mechanisms having the same functions as the corresponding mechanisms for the previously described apparatus.

An additional aspect of the invention is a computer controlled method for invoking a programmed operation in response to an initial access of a data structure element that is contained within a data structure. The method includes the step of aligning the data structure element on an even memory address. The data structure element is located at an even offset within the data structure such that the data structure element can be accessed using a non-byte access-mode. The method also associates a data structure access tag storage with the data structure. The data structure access tag storage initially contains an odd data structure memory address that is related to the data structure. Another step in the method is that of triggering a trap on the initial access of the data structure element. The trap is triggered by attempting an access of the data structure element using the non-byte access-mode with the odd data structure memory address and the even offset. The method also converts the odd data structure memory address within the data structure access tag storage to an even data structure address. Thus, subsequent attempts to access the data structure element, using the non-byte access-mode with the even data structure address and the even offset, will succeed without triggering the trap. In addition, the method includes the steps of invoking the programmed operation and of accessing the data structure element using the even data structure address.

In yet another aspect of the invention, a computer system is disclosed, including a central processing unit (CPU) and a memory coupled to said CPU, for invoking a programmed operation in response to an initial access of a data structure element contained within a data structure. The system comprises an alignment mechanism that is configured to align the data structure element on an even memory address of the memory. The data structure element is located at an even offset within the data structure such that the data structure element can be accessed from the memory using a non-byte access-mode of said CPU. The system also includes an access tag mechanism that is configured to associate a data structure access tag storage with the data structure. The data structure access tag storage initially contains an odd data structure memory address that is related to the data structure. The system additionally comprises a trigger mechanism that is configured to trigger a trap on the initial access of the data structure element by attempting to access the data structure element in the memory using the non-byte access-mode with the odd data structure memory address and the even offset. An address conversion mechanism is also included within the system. The address conversion mechanism is responsive to the trigger mechanism and is configured to convert the odd data structure memory address within the data structure access tag storage to an even data structure address. Thus, subsequent attempts to access the data structure element using the non-byte access-mode with the even data structure address and the even offset will succeed without triggering the trap. The system also comprises an invocation mechanism that is configured to invoke the programmed operation; and a data access mechanism that is configured to access the data structure element within the memory using the even data structure address.

Another aspect of the invention is an apparatus, having a central processing unit (CPU) and a memory coupled to said CPU, for invoking a programmed operation in response to an initial access of a data structure element contained within a data structure. The apparatus comprises an alignment mechanism that is configured to align the data structure element on an even memory address of the memory. The data structure element is located at an even offset within the data structure such that the data structure element can be accessed from the memory using a non-byte access-mode of said CPU. The apparatus also includes an access tag mechanism that is configured to associate a data structure access tag storage with the data structure. The data structure access tag storage initially contains an odd data structure memory address that is related to the data structure. The apparatus additionally comprises a trigger mechanism that is configured to trigger a trap on the initial access of the data structure element by attempting to access the data structure element in the memory using the non-byte access-mode with the odd data structure memory address and the even offset. An address conversion mechanism is also included within the apparatus. The address conversion mechanism is responsive to the trigger mechanism and is configured to convert the odd data structure memory address within the data structure access tag storage to an even data structure address. Thus, subsequent attempts to access the data structure element using the non-byte access-mode with the even data structure address and the even offset will succeed without triggering the trap. The apparatus also comprises an invocation mechanism that is configured to invoke the programmed operation; and a data access mechanism that is configured to access the data structure element within the memory using the even data structure address.

Yet a further aspect of the invention is a computer program product embodied on a computer usable storage medium for causing a computer to invoke a programmed operation in response to an initial access of a data structure element contained within a data structure. When executed on a computer, the computer readable code causes a computer to effect an alignment mechanism, an access tag mechanism, a trigger mechanism, an address conversion mechanism, an invocation mechanism, and a data access mechanism. Each of these mechanisms having the same functions as the corresponding mechanisms for the previously described apparatus.

The foregoing and many other aspects of the present invention will no doubt become obvious to those of ordinary skill in the art after having read the following detailed description of preferred embodiments that are illustrated in the various drawing figures.

DESCRIPTION OF PREFERRED EMBODIMENTS

Notations and Nomenclature

The following 'notations and nomenclature' are provided to assist in the understanding of the present invention and preferred embodiments thereof.

Call-site—A call site is the procedure used to invoke a programmed routine.

Class—The class is an OOP language's implementation that records information common to a set of objects instantiated from the same class or copied from other objects. One skilled in the art will understand that this data structure may or may not be the same data structure used to represent classes used by the programming language's implementation. In addition, the class itself may be an OOP object.

Data structure—A data structure is an ordered arrangement of storage in memory for variables. An OOP object is a specialized data structure.

Object—An object in the object oriented programming paradigm is an association between programmed methods and the data structures defined by a class and the instantiated storage that represents an OOP object of the class.

Pointer—A pointer is a data value that is used to reference a data structure or an object. One skilled in the art will understand that "pointer" includes, without limitation, a memory address to, or a value used to calculate the address to the information of interest and any functional equivalents including handles and similar constructs.

Programmed method—A programmed method is a programmed routine associated with an OOP object. The programmed method is invoked to cause the OOP object to perform an operation.

Programmed routine—A procedure that is called from a call-site such that when the procedure completes it returns to the next instruction after the call-site. A programmed routine corresponds to a "procedure", "function" or "routine" as these terms are used in the art.

Procedure—A procedure is a self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Operating Environment

Although the subsequent description of the invention is cast within the object oriented paradigm and is directed towards Java class objects, the techniques disclosed are applicable to other programming paradigms and that the description also applies to data structures.

Figure 1A:
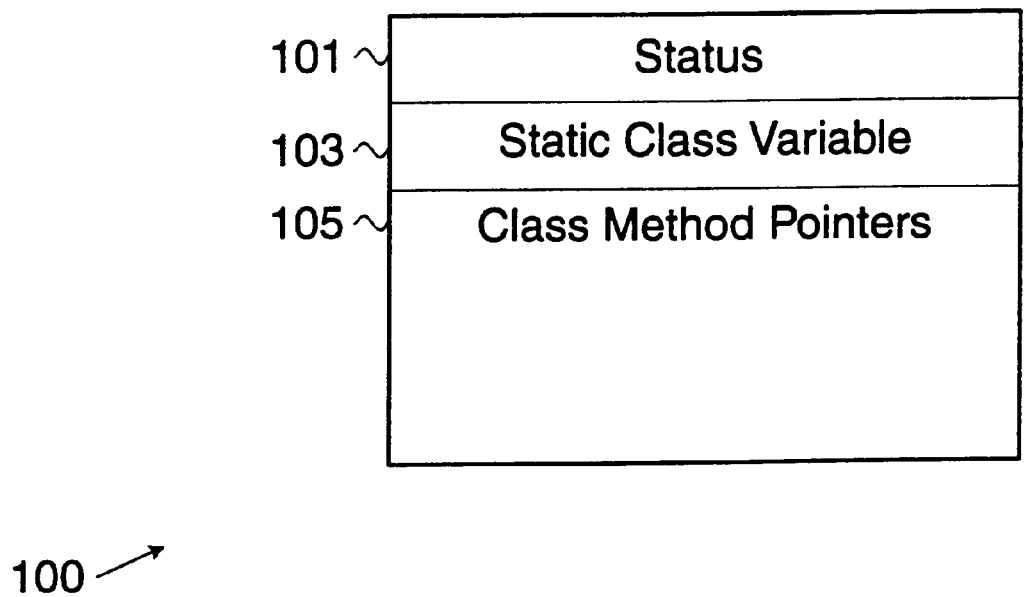
FIG. 1A illustrates a prior art class object.
Figure 1B:
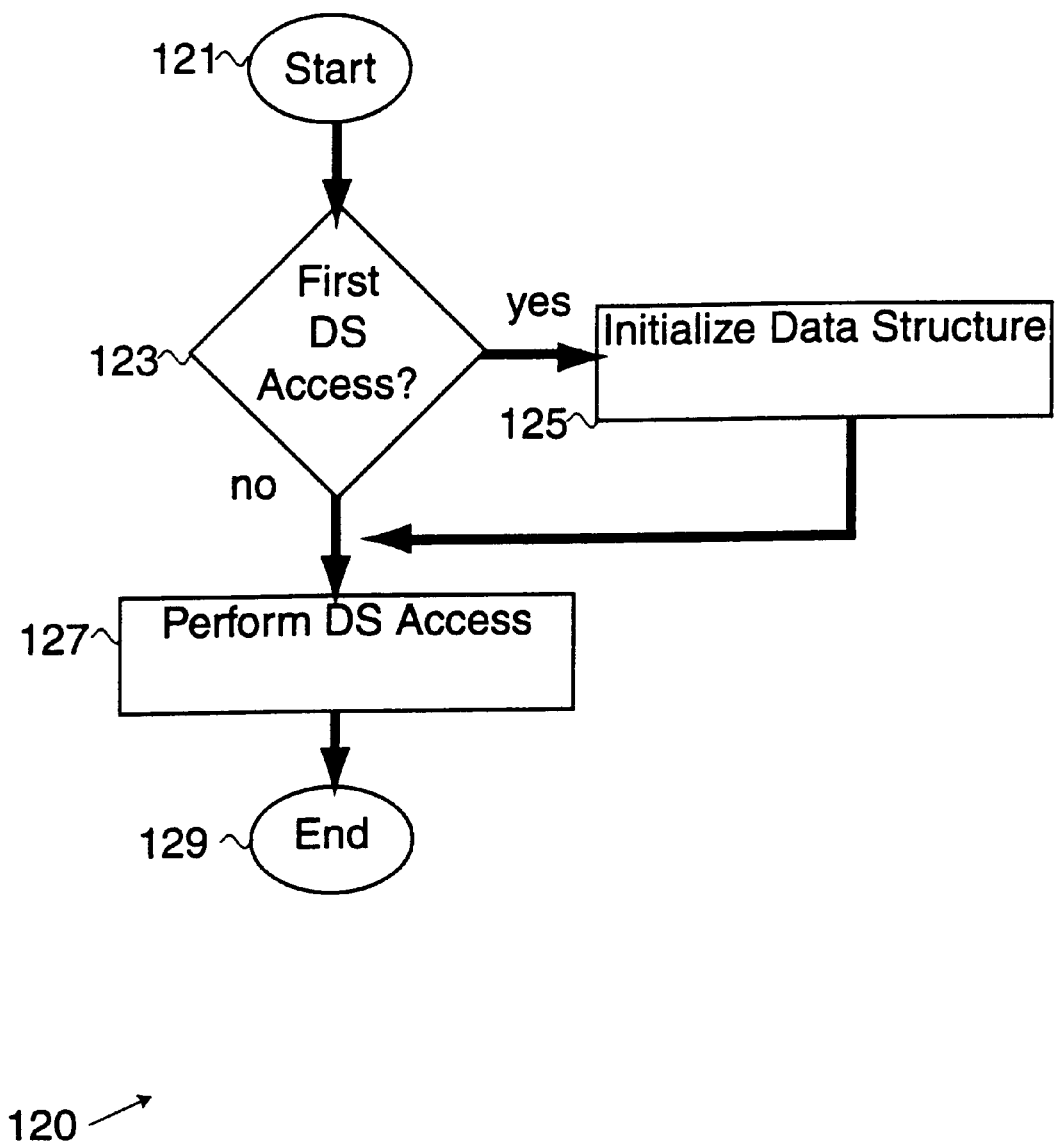
FIG. 1B illustrates a first prior art process used to detect a first active use of a data structure or OOP object.
Figure 1C:
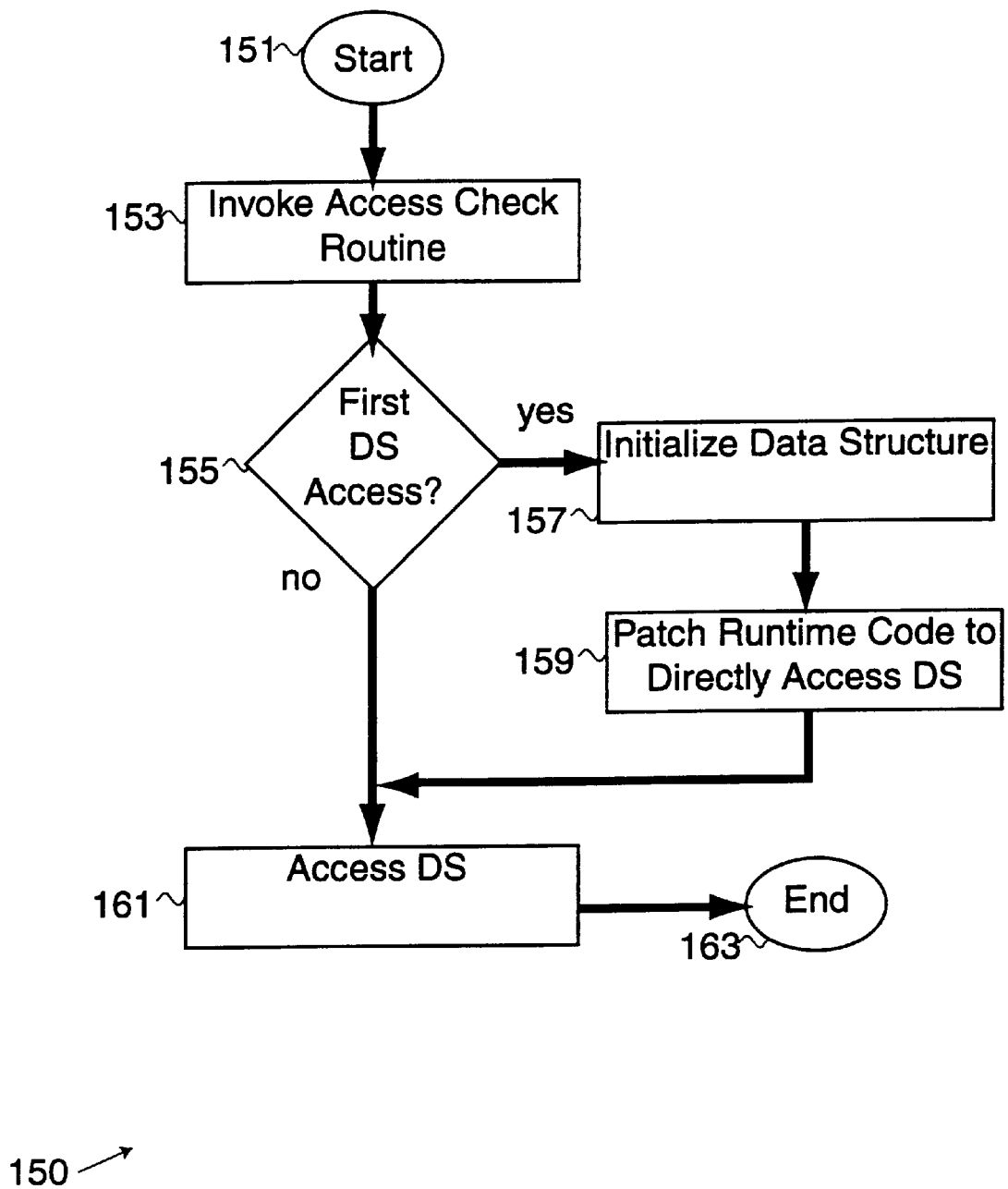
FIG. 1C illustrates a second prior art process used to detect a first active use of a data structure or OOP object and to optimize subsequent uses.
Figure 2:
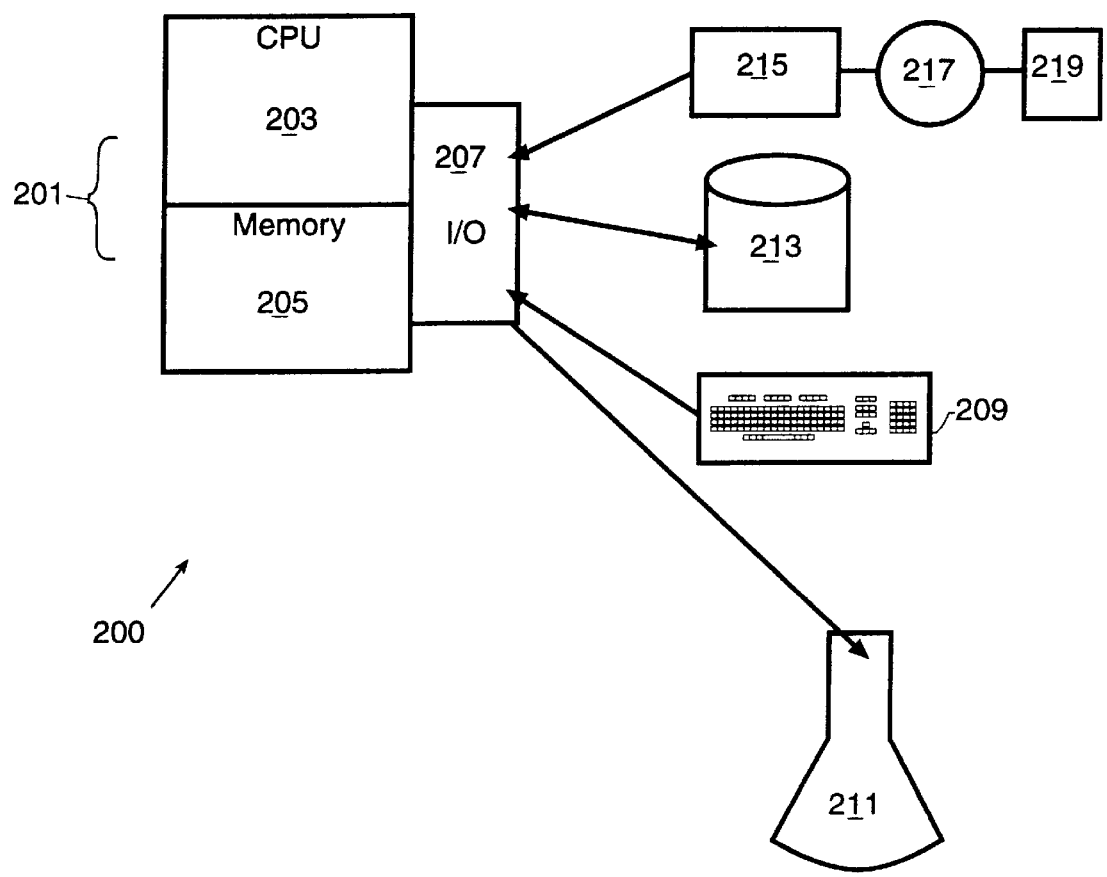
FIG. 2 illustrates a computer system capable of using the invention in accordance with a preferred embodiment.

The invention uses a computer. Some of the elements of a computer, as indicated by general reference character 200, configured to support the invention are shown in FIG. 2 wherein a processor 201 is shown, having a central processor unit (CPU) 203, a memory section 205 and an input/output (I/O) section 207. The I/O section 207 is connected to a keyboard 209, a display unit 211, a disk storage unit 213 and a CD-ROM drive unit 215. The CD-ROM drive unit 215 can read a CD-ROM medium 217 that typically contains a program and data 219. The CD-ROM drive unit 215, along with the CD-ROM medium 217, and the disk storage unit 213 comprise a filestorage mechanism. Such a computer system is capable of executing applications that embody the invention. One skilled in the art will understand that the CD-ROM drive unit 215 can be replaced by some other device that allows computer readable code to be read into the computer from some media, or over the network. Such a person will also understand that the invention can be practiced on a computer that does not include a keyboard or display.

The invention provides an efficient mechanism to detect a first active use of a data structure (including an OOP object) and to initialize the data structure just prior to the first active use. The invention operates by causing the first active use of a data structure to cause a misaligned memory access fault that results in a trap. This is accomplished by requiring that the memory access operation be performed using a memory access mode that requires an even memory address and attempting the memory access at an odd memory address. The trap handler converts the memory address to an even memory address, performs the data structure initialization, and causes the computer to re-execute the instruction that caused the trap. This attempt to access the now-initialized data structure will succeed because the memory address been converted.

Figure 3:
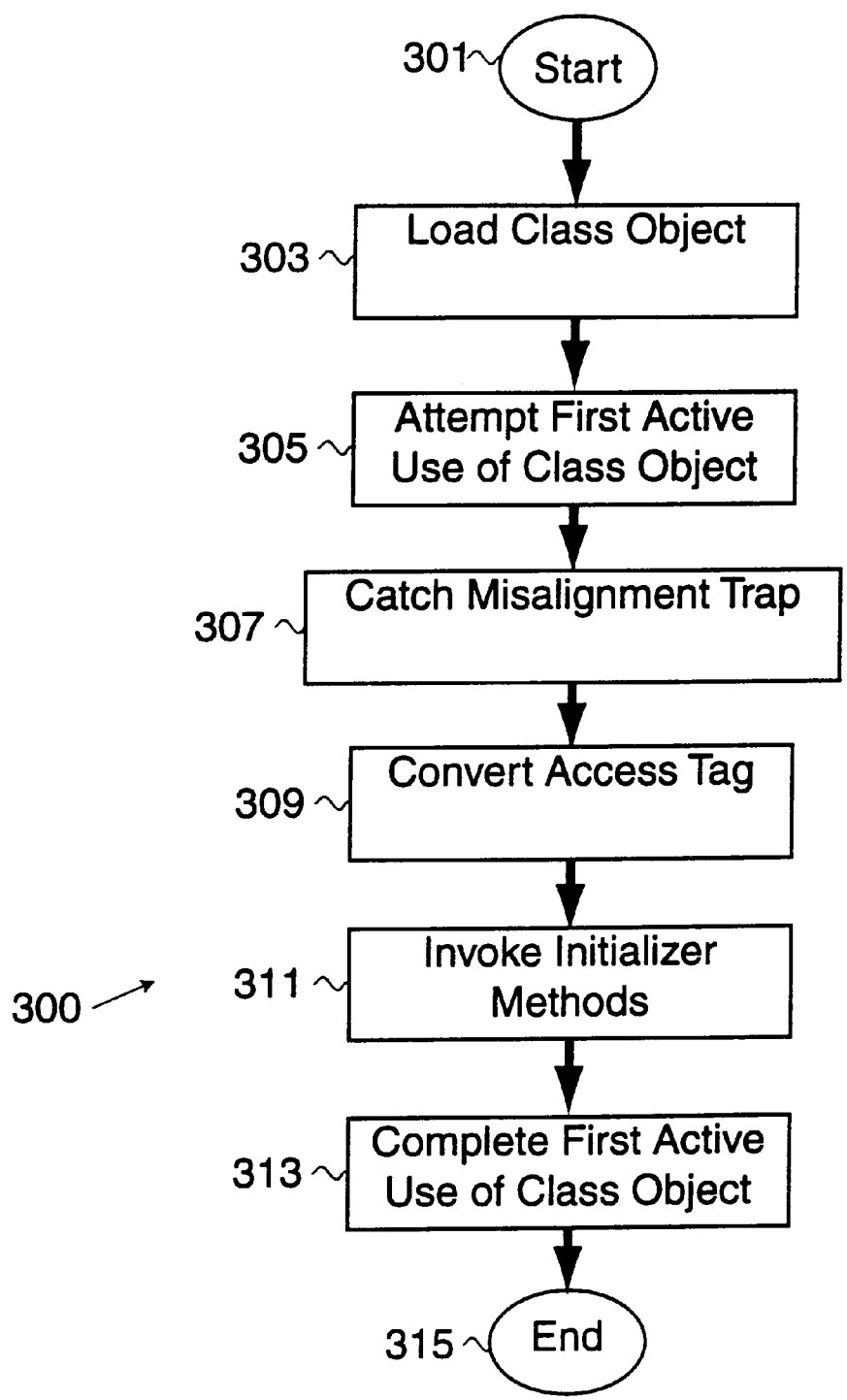
FIG. 3 illustrates the operational overview of the invention in accordance with a preferred embodiment.

FIG. 3 illustrates a 'class object initialization' process, indicated by general reference character 300, used to initialize a class object in response to the first active use of the class object (the initial access). One skilled in the art will understand that the class object is a data structure. The 'class object initialization' process 300 initiates at a 'start' terminal 301 and continues to a 'load class object' procedure 303. The 'load class object' procedure 303 allocates memory for the class object and may pre-initialize the class object. The pre-initialization allows the class object to be used by the program containing the object. The pre-initialization is directed to items such as the size of the class object, method pointers, and an initial access tag. However, no user-specified initialization occurs during pre-initialization.

The access tag is pre-initialized to contain a misaligned memory address such that a memory access using an aligned memory access-mode will fail when using an even offset with the access tag. Generally the misaligned memory address is an odd data structure memory address associated with the class object and the aligned memory access-mode is a non-byte access-mode. One skilled in the art will understand that the odd data structure memory address often points to an odd byte location within the class object. Although the class object may be pre-initialized, the data structure elements used as variables within the class object are not initialized until the program attempts a first active use of any of the data structure elements within the class object. One skilled in the art will understand that every access to the class object uses the access tag so that any access to the class object can be the first active use of the class object.

Eventually an executing program attempts the first active use of the class at an 'attempt first active use of class' procedure 305 by attempting to access a static class variable. This procedure uses the class' access tag to attempt an indirect-indexed memory access using a non-byte access-mode to access the static class variable (all active uses of the class utilize this technique to actively use the class so that any active use can be the first attempted active use). Because the access tag is pre-initialized to an odd data structure memory address, the memory access attempt fails (because only a byte access-mode instruction can access memory starting at an odd byte boundary). The computer detects the illegal memory access attempt and triggers a trap. The trap causes the computer to execute a 'catch misalignment trap' procedure 307 that detects that the memory access was within a class object that was not initialized. The subsequent description describes the invention with respect to modem computer systems that will trap a misaligned memory access attempt when the memory access mode is non-byte oriented and is addressed to an odd memory address.

The 'class object initialization' process 300 then modifies the access tag, at a 'convert access tag' procedure 309, so that a subsequent non-byte access-mode memory access using the access tag will succeed without causing the misaligned memory access fault. Generally, this modification consists of converting the access tag to an even address within the class object. Thus, subsequent non-byte access-mode accesses will succeed when using the access tag with an even offset. After the 'class object initialization' process 300 converts the access tag, it continues to an 'invoke initializer methods' procedure 311 that invokes a programmed operation that performs initialization for static class variables and user-specified initialization operations. These initialization processes access the data structure using the modified access tag. Once the data structure is completely initialized, a 'complete first active use of class' procedure 313 causes the trap handler to adjust the return program counter (if required) and execute a trap return to re-execute the 'attempt first active use of class' procedure 305. Because the access tag is now even, the 'attempt first active use of class' procedure 305 will successfully complete. The 'class object initialization' process 300 then complet'end' termian 'end' terminal 315.

Figure 4:
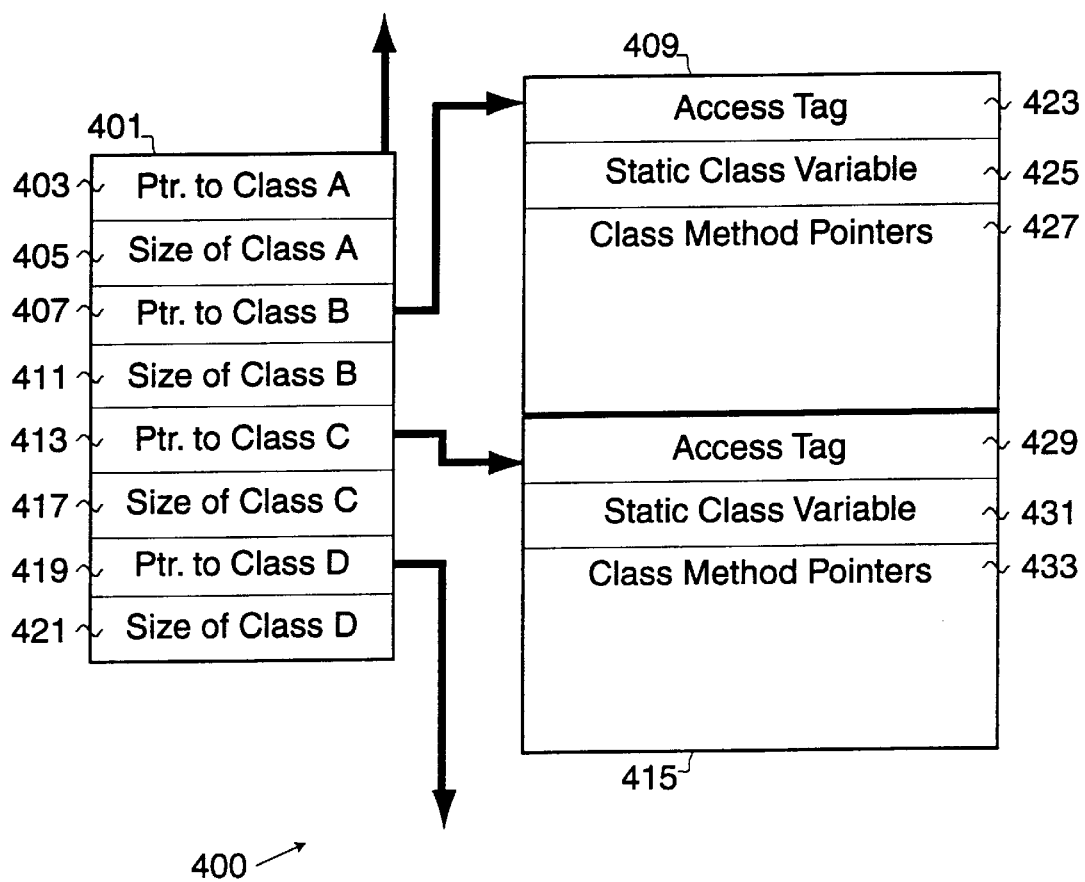
FIG. 4 illustrates a look-up table used to associate a misaligned memory address with a specific class or data structure in accordance with a preferred embodiment.

FIG. 4 illustrates a 'look-up' table, indicated by general reference character 400, used by a preferred embodiment to associate the access tag with a class object. The 'look-up' table 400 contains a 'class pointer and extent' array 401 that can be an array of structures, a two dimensional array, or other storage arrangement known in the art. The 'class pointer and extent' array 401 includes a 'pointer to class A' field 403 that contains a pointer to the first byte of the "A" class (not shown). The 'class pointer and extent' array 401 also includes a 'size of class A' field 405 that contains the size of the "A" class. Similarly, a 'pointer to class B' field 407 contains the address of a 'class B' instance 409 that (as are all the classes) is aligned on an even memory address. A 'size of class B' field 411 contains the size of the 'class B' instance 409. A 'pointer to class C' field 413 contains a pointer to a 'class C' instance 415 and a 'size of class C' field 417 contains the size of the 'class C' instance 415. A 'pointer to class D' field 419 contains a pointer to the first byte of the "D" class (not shown). A 'size of class D' field 421 contains the size of the "D" data structure.

One skilled in the art will understand that, in a non-OOP environment, the 'class pointer and extent' array 401 includes pointers to data structures and the size of the data structures. One skilled in the art will also understand that many mechanisms exist for creating the 'class pointer and extent' array 401. These mechanisms include (without limitation) creating the 'class pointer and extent' array 401 using a compiler (or assembler) along with a linker, dynamically constructing the 'class pointer and extent' array 401 when data structures or classes are allocated from memory and many other similar techniques.

The 'class B' instance 409 includes a 'class B access tag' field 423 that is used to store the access tag. In this embodiment, the initial content of the access tag field is set, during pre-initialization, to be an odd data structure memory address such as the address of the 'class B' instance 409 plus one. During the initialization process, the access tag is modified to point to an even data structure address. Thus, the modified access tag points to an even memory address within the class. One preferred embodiment points the modified access tag to the first instance variable in the class. Another preferred embodiment points the modified access tag to the start of the class. The 'class B' instance 409 also includes a 'static class variable' field 425 that serves as storage for a class instance variable shared by all the classes' objects. In the Java environment, the 'static class variable' field 425 must be initialized at the first active use of the class.

The 'class B' instance 409 also includes a 'class method access' storage 427. One skilled in the art will understand that the 'class method access' storage 427 provides means for instantiated objects of the class to invoke the object's methods. The 'class C' instance 415 also includes a 'class C access tag' field 429 having the same characteristics as that of the 'class B access tag' field 423 but initially containing a value that is the address of the 'class C' instance 415 plus one. The 'class C' instance 415 also contains a 'static class variable' field 431 and a 'class method access' storage 433 having similar characteristics as the corresponding fields in the 'class B' instance 409.

The 'class B access tag' field 423, the 'static class variable' field 425, the 'class method access' storage 427, the 'class C access tag' field 429, the 'static class variable' field 431 and the 'class method access' storage 433 are all aligned on even memory addresses using one or more alignment mechanisms that are well understood in the art. This alignment can be accomplished by requiring that each static class variable start on an even offset from the start of the class instance and that the class instance also start at an even memory address. Another requirement is that each static class variable be accessed using a non-byte access-mode. Thus, a single byte static class variable is expanded by the compiler to be at least two bytes in length and aligned on an even numbered byte. The 'look-up' table 400 provides an access tag mechanism that associates the access tag with the class.

Figure 5:
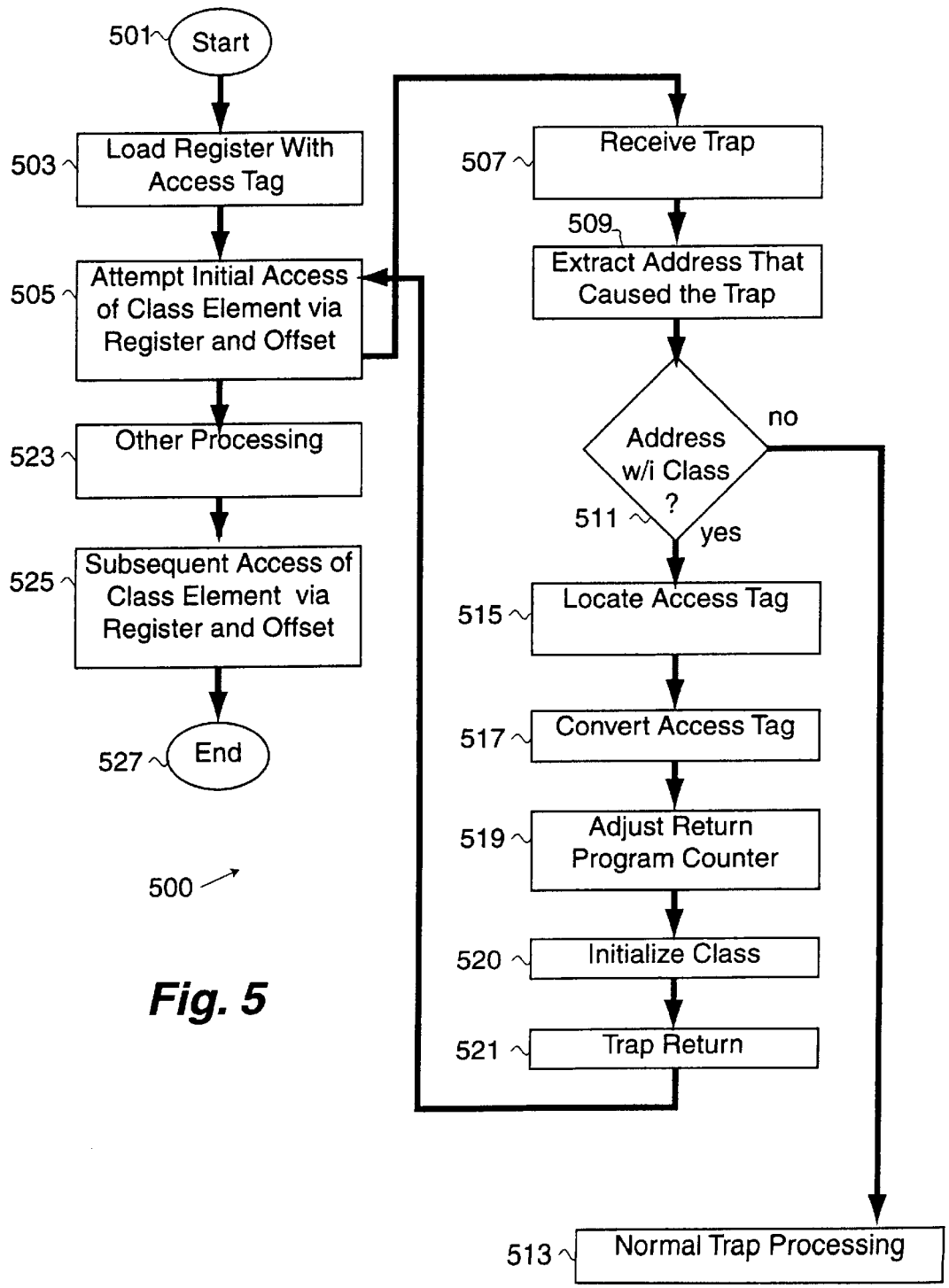
FIG. 5 illustrates a detailed class object usage process in accordance with a preferred embodiment.

FIG. 5 illustrates a 'class object usage' process, indicated by general reference character 500, showing a first active use of the class object followed by a subsequent active use. The 'class object usage' process 500 initiates at a 'start' terminal 501 and continues to a 'load access tag' procedure 503. The 'load access tag' procedure 503 retrieves the access tag from the access field in the class (for example the 'class B access tag' field 423) and places the access tag value in a form that can be used in an indirect-indexed operation. This generally comprises loading the contents of the class' access tag into a register so that a memory access can be performed at a memory location that is offset from the pointer in the register. Next, an 'initial access' procedure 505 attempts to access the data structure element (such as the 'static class variable' field 425) as an offset from the address pointed to by the pointer in the register. This access is attempted using a non-byte access-mode. This access attempt triggers the computer to generate a misaligned memory access fault on this initial access because the access tag is an odd address with an even offset and uses a non-byte access-mode memory access. Thus, this attempted access is a trigger mechanism that invokes a trap on the first active use of the class object.

One skilled in the art will understand that the address of the data structure element in the class object can be generated by adding the even offset of the data structure element to the access tag value in the register; that the even offset can be used as an offset from the access tag value contained in the register, or other suitable mechanism that is available using the computer's addressing modes.

The resulting trap process saves the state of the computer (including the register containing the access tag) and invokes a 'receive trap' procedure 507 within a trap handler. An 'extract address' procedure 509 within the trap handler examines the saved computer state and the instruction that caused the misaligned memory access fault and extracts the odd memory address that caused the fault and determines which register contained the access tag at the time of the trap. Once this address is extracted, an 'address in class object' decision procedure 511 determines whether the extracted address is an address within some relevant OOP class object (data structure) using the 'look-up' table 400. One skilled in the art will understand how to compare the extracted address with the information within the 'class pointer and extent' array 401 to make this determination. If the extracted address is not an address within some relevant OOP class, the 'class object usage' process 500 continues to a 'normal trap processing' procedure 513 to process the trap using prior art methods as the trap was not related to the first active use of the class.

However, if the address was an address within one of the areas of memory (OOP classes) defined by the 'class pointer and extent' array 401, the 'address in class object' decision procedure 511 generates a pointer to the class object that contains the address. Then the 'class object usage' process 500 continues to a 'locate access tag' procedure 515 that uses the corresponding pointer in the 'class pointer and extent' array 401 to locate the access tag field associated with the class object as is subsequently described with respect to FIG. 6A.

Next, the 'class object usage' process 500 continues to a 'convert access tag' procedure 517 that converts the access tag stored in an access tag field (such as the 'class B access tag' field 423) so that it points to an even memory address such that a non-byte access-mode memory access made to an even offset from the access tag will access the intended data structure element. The 'convert access tag' procedure 517 is subsequently described with respect to FIG. 6B.

After the access tag is converted, the 'class object usage' process 500 continues to an 'adjust return program counter' procedure 519. The 'adjust return program counter' procedure 519 modifies the state saved by the 'receive trap' procedure 507 to convert the contents of the register containing the access tag to contain the converted access tag. The 'adjust return program counter' procedure 519 also adjusts the program counter to re-execute the attempted memory operation (that invoked the trap) with the converted access tag. Next a 'class initialization' procedure 520 initializes the class. One skilled in the art will understand that the 'class initialization' procedure 520 is an example of an invocation mechanism used to invoke a programmed operation. One skilled in the art will also understand that the initialization will succeed as the access tag has been converted prior to the execution of the 'class initialization' procedure 520. Finally a 'trap return' procedure 521 restores the computer state (as modified by the 'adjust return program counter' procedure 519) and returns to reexecute the instruction that caused the trap at the 'initial access' procedure 505. Because the access tag is no longer odd, the previously attempted memory access successfully accesses the initialized data structure. Next the 'class object usage' process 500 continues to an 'other processing' procedure 523 that performs other procedures. Eventually, a 'subsequent access' procedure 525 attempts another access to one of the data structure elements in the data structure using the converted access tag and the even offset to the data structure element in the class object. Because the converted access tag is even, this operation (the data access mechanism) completes without causing a trap. The 'class object usage' process 500 completes through an 'end' terminal 527. One skilled in the art will understand that the actual sequence of the previously described step can be modified to achieve similar results.

One preferred embodiment of the invention is used to initialize static class variables within a Java class object. This embodiment uses the invoked programmed operation as an initializing procedure that invokes the Java class initializers.

Figure 6A:
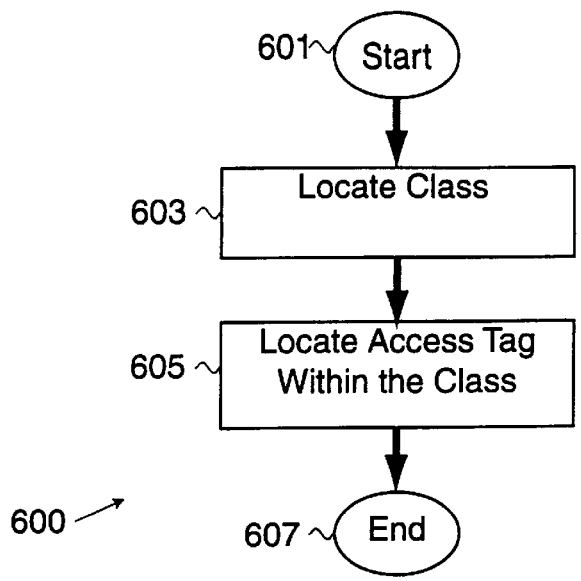
FIG. 6A illustrates a 'locate access tag' process in accordance with a preferred embodiment.

FIG. 6A illustrates a 'locate access tag' process, indicated by general reference character 600, invoked by the 'locate access tag' procedure 515 of FIG. 5. The 'locate access tag' process 600 initiates at a 'start' terminal 601 and continues to a 'locate class' procedure 603 that uses the address of the data structure returned by the 'address in class object' decision procedure 511 as a pointer to the relevant data structure. Then, a 'locate access tag' procedure 605 finds the data structure element that contains the access tag (for example the 'class B access tag' field 423) and returns a pointer to the access tag storage so that the access tag can be converted by the 'convert access tag' procedure 517 of FIG. 5. Although a preferred embodiment places the access tag as the first data structure element in an OOP object or data structure, one skilled in the art will understand that many techniques exist to associate the access tag with its OOP object or data structure.

Figure 6B:
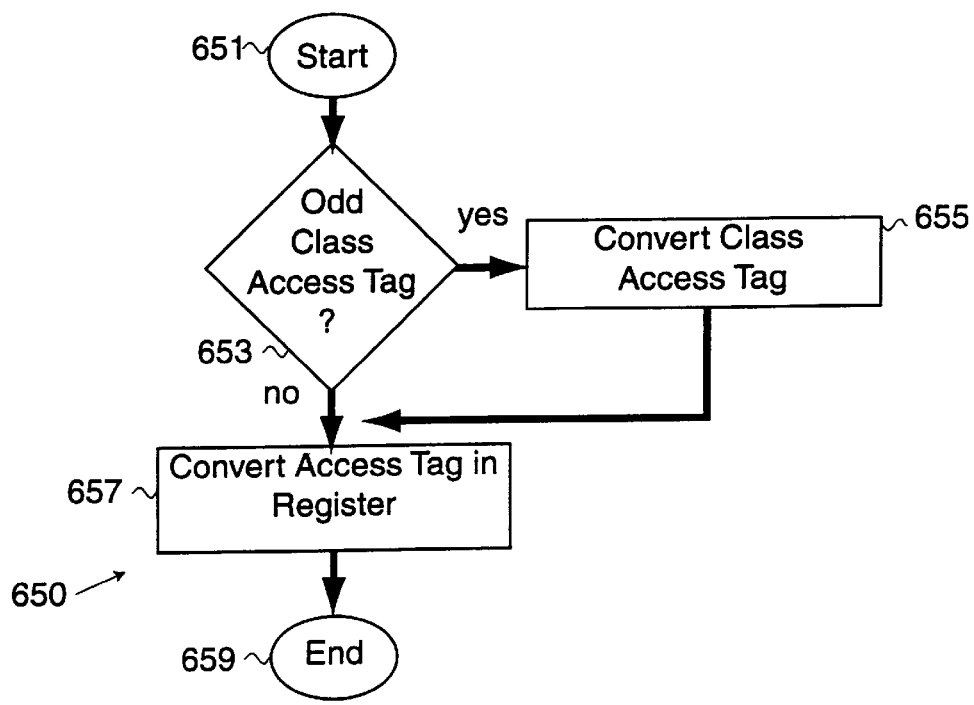
FIG. 6B illustrates a 'convert access tag' process in accordance with a preferred embodiment.

FIG. 6B illustrates a 'convert access tag' process, indicated by general reference character 650 that is invoked by the 'convert access tag' procedure 517 of FIG. 5. The 'convert access tag' process 650 effectuates an address conversion mechanism. The 'convert access tag' process 650 initiates at a 'start' terminal 651 and continues to an 'odd class access tag' decision procedure 653 that determines whether the access tag associated with the class has not been changed. If the class's access tag is odd, the 'convert access tag' process 650 continues to a 'convert class access tag' procedure 655 that converts the access tag stored in an access tag field (such as the 'class B access tag' field 423) so that it points to an even memory address. Thus, a non-byte access-mode memory access made to an even offset from the access tag will access the intended data structure element. The 'convert access tag' process 650 then continues to a 'convert access tag in register' procedure 657 after the 'convert class access tag' procedure 655. The 'convert access tag in register' procedure 657 is also reached if the 'odd class access tag' decision procedure 653 determined that the class' access tag was even. The 'convert access tag in register' procedure 657 also converts the access tag that is in the register saved by the 'receive trap' procedure 507. Thus, when the trap returns, subsequent accesses to the class using that register will succeed. One skilled in the art will understand that the register that contains the odd access tag is determined by examining the instruction that caused the trap during the 'extract address' procedure 509. Finally, the 'locate access tag' process 600 completes through an 'end' terminal 659.

One preferred embodiment is practiced within the procedural program paradigm. Another preferred embodiment is practiced using classes in the object-oriented programming (OOP) paradigm. In the OOP paradigm, the data structure is included in a class and the data structure element is a static class variable. One skilled in the art will understand that the invention can be used to invoke a programmed operation responsive to the first memory access to an area of memory. One preferred embodiment is used in Java environments to initialize static class variables at the class' first active use as required by the Java programming language specification.

The invention efficiently invokes a programmed operation when a data structure or OOP object is first accessed. In particular the invention provides an efficient mechanism for initializing Java classes at their first active use.

From the foregoing, it will be appreciated that the invention has (without limitation) the following advantages:

1) The runtime check for the first active use of a data structure is transparent to a compiler optimizer.

2) Compiler optimizations of computer instructions used to access the data structure can safely optimize such computer instructions without requiring special optimization cases.

3) Only the first active use of the data structure incurs any overhead. Subsequent active uses do not.

Although the present invention has been described in terms of presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for invoking a programmed operation on a data structure responsive to a first active use of said data structure, said method comprising the steps of:

(b) causing a condition for a misaligned memory access fault;

(c) associating a data structure access tag storage with said data structure, said data structure access tag storage initially containing a misaligned memory address related to said data structure;

(d) requiring a memory access operation to be performed using a memory access mode which requires a memory address in a first address sense, and attempting memory access at a memory address in a second memory sense;

(e) triggering a trap on said first active use of said data structure by attempting to access said data structure using said misaligned memory address with an aligned memory access-mode; and (f) converting said misaligned memory address within said data structure access tag storage from the first memory sense to the second memory sense to an aligned memory address whereby subsequent attempts to access said data structure using said aligned memory access-mode and contents of said data structure access tag storage will succeed without triggering said trap as a result of the memory address being in the second memory sense.

2. The computer controlled method of claim 1 further comprising:

(a) aligning said data structure at said aligned memory address such that said data structure can be accessed using said aligned memory access-mode and contents of said data structure access tag storage.

3. The computer controlled method of claim 1 further comprising:

(g) invoking said programmed operation; and (h) accessing said data structure using said aligned memory address and said aligned memory access-mode.

4. The computer controlled method of claim 3 whereby said aligned memory address in the first memory sense is an even memory address and said misaligned memory address in the second memory sense is an odd memory address.

5. A computer controlled method for invoking a programmed operation in response to an initial access of a data structure element contained within a data structure, said method comprising the steps of:

(a) aligning said data structure element on an even memory address, said data structure element located at an even offset within said data structure such that said data structure element can be accessed using a non-byte access-mode;

(b) associating a data structure access tag storage with said data structure, said data structure access tag storage initially containing an odd data structure memory address related to said data structure; (c) triggering a trap on said initial access of said data structure by attempting to access said data structure element using said non-byte access-mode with said odd data structure memory address and said even offset;

(d) converting said odd data structure memory address within said data structure access tag storage to an even data structure address whereby subsequent attempts to access said data structure element using said non-byte access-mode with said even data structure address and said even offset will succeed without triggering said trap;

(e) invoking said programmed operation; and (f) accessing said data structure element using said even data structure address, wherein said data structure is related to an object-oriented programming object, and said object-oriented programming object is a Java class object initialized at said Java class object's first active use.

6. A computer controlled system, having a central processing unit (CPU) and a memory coupled to said CPU, for invoking a programmed operation on a data structure responsive to a first active use of said data structure, said system comprises:

an association mechanism configured to associate a data structure access tag storage with said data structure, said data structure access tag storage initially containing a misaligned memory access related to said data structure, the misaligned memory access establishing a condition for a misaligned memory access fault;

a misaligned memory access error mechanism configured to trigger a trap on said first active use of said data structure by attempting to access said data structure using an aligned memory access-mode with said misaligned memory address associated with said data structure by the association mechanism, the misaligned memory access error mechanism requiring a memory access operation to be performed using a memory access mode which requires a memory address in a first address sense, and attempting memory access at a memory address in a second memory sense; and an address conversion mechanism configured to convert said misaligned memory address within said data structure access tag storage to an aligned memory address responsive to the misaligned memory access error mechanism whereby subsequent attempts to access said data structure using said aligned memory access-mode and contents of said data structure access tag storage will succeed without triggering said trap.

7. The computer controlled system of claim 6 further comprising:

an alignment mechanism configured to align said data structure at said aligned memory address such that said data structure can be accessed using said aligned memory access-mode and contents of said data structure access tag storage.

8. The computer controlled system of claim 6 further comprising:

an invocation mechanism, responsive to the misaligned memory access error mechanism, configured to invoke said programmed operation; and an access mechanism configured to access said data structure using said aligned memory address and said aligned memory access-mode.

9. The computer controlled system of claim 8 whereby said aligned memory address is an even memory address and said misaligned memory address is an odd memory.

10. A computer controlled system, having a central processing unit (CPU) and a memory coupled to said CPU, for invoking a programmed operation in response to an initial access of a data structure element contained within a data structure, wherein said system comprises:
- an alignment mechanism configured to align said data structure element on an even memory address of said memory, said data structure element located at an even offset within said data structure such that said data structure element can be accessed from said memory using a non-byte access-mode of said CPU;
- an access tag mechanism configured to associate a data structure access tag storage with said data structure, said data structure access tag storage initially containing an odd data structure memory address related to said data structure;
- a trigger mechanism configured to trigger a trap on said initial access of said data structure element by attempting to access said data structure element in said memory using said non-byte access-mode with said odd data structure memory address and said even offset;
- an address conversion mechanism, responsive to the trigger mechanism, configured to convert said odd data structure memory address within said data structure access tag storage to an even data structure address whereby subsequent attempts to access said data structure element using said non-byte access-mode with said even data structure address and said even offset will succeed without triggering said trap;
- an invocation mechanism configured to invoke said programmed operation; and
- a data access mechanism configured to access said data structure element within said memory using said even data structure address, wherein said data structure is related to an object-oriented programming object, and said object-oriented programming object is a Java class object initialized at said Java class object's first active use.

11. An apparatus having a central processing unit (CPU) and a memory coupled to said CPU for invoking a programmed operation on a data structure responsive to a first active use of said data structure, said apparatus comprises:
- an association mechanism configured to associate a data structure access tag storage with said data structure, said data structure access tag storage initially containing a misaligned memory address related to said data structure, the misaligned memory access establishing a condition for a misaligned memory access fault;
- a misaligned memory access error mechanism configured to trigger a trap on said first active use of said data structure by attempting to access said data structure using an aligned memory access-mode with said misaligned memory address associated with said data structure by the association mechanism, the misaligned memory access error mechanism requiring a memory access operation to be performed using a memory access mode which requires a memory address in a first address sense, and attempting memory access at a memory address in a second memory sense; and
- an address conversion mechanism configured to convert said misaligned memory address within said data structure access tag storage to an aligned memory address responsive to the misaligned memory access error mechanism whereby subsequent attempts to access said data structure using said aligned memory access-mode and contents of said data structure access tag storage will succeed without triggering said trap.

12. The apparatus of claim further comprising:
- an alignment mechanism configured to align said data structure at said aligned memory address such that said data structure can be accessed using said aligned memory access-mode and contents of said data structure access tag storage.

13. The apparatus of claim 11 further comprising:
- an invocation mechanism, responsive to the misaligned memory access error mechanism, configured to invoke said programmed operation; and
- an access mechanism configured to access said data structure using said aligned memory address and said aligned memory access-mode.

14. The apparatus of claim 13 whereby said aligned memory address is an even memory address and said misaligned memory address is an odd memory address.

15. An apparatus having a central processing unit (CPU) and a memory coupled to said CPU for invoking a programmed operation in response to an initial access of a data structure element contained within a data structure, wherein said apparatus comprises:
- an alignment mechanism configured to align said data structure element on an even memory address of said memory, said data structure element located at an even offset within said data structure such that said data structure element can be accessed from said memory using a non-byte access-mode of said CPU;
- an access tag mechanism configured to associate a data structure access tag storage with said data structure, said data structure access tag storage initially containing an odd data structure memory address related to said data structure;
- a trigger mechanism configured to trigger a trap on said initial access of said data structure element by attempting to access said data structure element in said memory using said non-byte access-mode with said odd data structure memory address and said even offset;
- an address conversion mechanism, responsive to the trigger mechanism, configured to convert said odd data structure memory address within said data structure access tag storage to an even data structure address whereby subsequent attempts to access said data structure element using said non-byte access-mode with said even data structure address and said even offset will succeed without triggering said trap;
- an invocation mechanism configured to invoke said programmed operation; and
- a data access mechanism configured to access said data structure element within said memory using said even data structure address, wherein said data structure is related to an object-oriented programming object, and said object-oriented programming object is a Java class object initialized at said Java class object's first active use.

16. A computer program product comprising:
- a computer usable storage medium having computer readable code embodied therein for invoking a programmed operation on a data structure responsive to a first active use of said data structure, said computer readable code comprising:
- computer readable code configured to cause a condition for a misaligned memory access fault;

computer readable code configured to cause said computer to effect an association mechanism configured to associate a data structure access tag storage with said data structure, said data structure access tag storage initially containing a misaligned memory address related to said data structure;

computer readable code configured to require a memory access operation to be performed using a memory access mode which requires a memory address in a first address sense, and attempting memory access at a memory address in a second memory sense;

computer readable code configured to cause said computer to effect a misaligned memory access error mechanism configured to trigger a trap on said first active use of said data structure by attempting to access said data structure using an aligned memory access-mode with said misaligned memory address associated with said data structure by the association mechanism; and computer readable code configured to cause said computer to effect an address conversion mechanism configured to convert said misaligned memory address within said data structure access tag storage from the first memory sense to an aligned memory address responsive to the misaligned memory access error mechanism whereby subsequent attempts to access said data structure using said aligned memory access-mode and contents of said data structure access tag storage will succeed without triggering said trap as a result of the memory address being in the second memory sense.

17. The computer program product of claim 16 further comprising:

computer readable code configured to cause said computer to effect an alignment mechanism configured to align said data structure at said aligned memory address such that said data structure can be accessed using said aligned memory access-mode and contents of said data structure access tag storage.

18. The computer program product of claim 16 further comprising:

computer readable code configured to cause said computer to effect an invocation mechanism, responsive to the misaligned memory access error mechanism, configured to invoke said programmed operation; and computer readable code configured to cause said computer to effect an access mechanism configured to access said data structure using said aligned memory address and said aligned memory access-mode.

19. The computer program product of claim 18 whereby said aligned memory address is an even memory address and said misaligned memory address is an odd memory address.

20. A computer program product comprising:

a computer usable storage medium having computer readable code embodied therein for invoking a programmed operation in response to an initial access of a data structure element contained within a data structure, said computer readable code comprising:

establishing a condition for a misaligned memory access fault;

computer readable code configured to cause said computer to effect an alignment mechanism configured to align said data structure element on an even memory address of said memory, said data structure element located at an even offset within said data structure such that said data structure element can be accessed from said memory using a non-byte access-mode of said CPU;

computer readable code configured to cause said computer to effect an access tag mechanism configured to associate a data structure access tag storage with said data structure, said data structure access tag storage initially containing an odd data structure memory address related to said data structure;

requiring a memory access operation to be performed using a memory access mode which requires a memory address in a first address sense, and attempting memory access at a memory address in a second memory sense;

computer readable code configured to cause said computer to effect a trigger mechanism configured to trigger a trap on said initial access of said data structure element by attempting to access said data structure element in said memory using said non-byte access-mode with said odd data structure memory address and said even offset;

computer readable code configured to cause said computer to effect an address conversion mechanism, responsive to the trigger mechanism, configured to convert said odd data structure memory address within said data structure access tag storage to an even data structure address whereby subsequent attempts to access said data structure element using said non-byte access-mode with said even data structure address and said even offset will succeed without triggering said trap;

computer readable code configured to cause said computer to effect an invocation mechanism configured to invoke said programmed operation; and computer readable code configured to cause said computer to effect a data access mechanism configured to access said data structure element within said memory using said even data structure address, wherein said data structure is related to an object-oriented programming object, and said object-oriented programming object is a Java class object initialized at said Java class object's first active use.

21. A computer controlled method for invoking a programmed operation in response to an initial access of a data structure element contained within a data structure, said method comprising the steps of:

(a) aligning said data structure element on an even memory address, said data structure element located at an even offset within said data structure such that said data structure element can be accessed using a non-byte access-mode;

(b) associating a data structure access tag storage with said data structure, said data structure access tag storage initially containing an odd data structure memory address related to said data structure;

(c) triggering a trap on said initial access of said data structure by attempting to access said data structure element using said non-byte access-mode with said odd data structure memory address and said even offset;

(d) converting said odd data structure memory address within said data structure access tag storage to an even data structure address whereby subsequent attempts to access said data structure element using said non-byte access-mode with said even data structure address and said even offset will succeed without triggering said trap;

(e) invoking said programmed operation; and (f) accessing said data structure element using said even data structure address, wherein said programmed operation is an initializing procedure that initializes said data structure element in said data structure at said data structure's first active use.

22. A computer controlled method for invoking a programmed operation in response to an initial access of a data structure element contained within a data structure, said method comprising the steps of:
(a) aligning said data structure element on an even memory address, said data structure element located at an even offset within said data structure such that said data structure element can be accessed using a non-byte access-mode;
(b) associating a data structure access tag storage with said data structure, said data structure access tag storage initially containing an odd data structure memory address related to said data structure;
(c) triggering a trap on said initial access of said data structure by attempting to access said data structure element using said non-byte access-mode with said odd data structure memory address and said even offset;
(d) converting said odd data structure memory address within said data structure access tag storage to an even data structure address whereby subsequent attempts to access said data structure element using said non-byte access-mode with said even data structure address and said even offset will succeed without triggering said trap;
(e) invoking said programmed operation; and
(f) accessing said data structure element using said even data structure address, wherein said data structure element is a static class variable in a Java class object and said programmed operation is an initializing procedure that initializes said static class variable by invoking a class initializer on said Java class object.

23. A computer controlled system, having a central processing unit (CPU) and a memory coupled to said CPU, for invoking a programmed operation in response to an initial access of a data structure element contained within a data structure, wherein said system comprises:
an alignment mechanism configured to align said data structure element on an even memory address of said memory, said data structure element located at an even offset within said data structure such that said data structure element can be accessed from said memory using a non-byte access-mode of said CPU;
an access tag mechanism configured to associate a data structure access tag storage with said data structure, said data structure access tag storage initially containing an odd data structure memory address related to said data structure;
a trigger mechanism configured to trigger a trap on said initial access of said data structure, element by attempting to access said data structure element in said memory using said non-byte access-mode with said odd data structure memory address and said even offset;
an address conversion mechanism, responsive to the trigger mechanism, configured to convert said odd data structure memory address within said data structure access tag storage to an even data structure address whereby subsequent attempts to access said data structure element using said non-byte access-mode with said even data structure address and said even offset will succeed without triggering said trap;
an invocation mechanism configured to invoke said programmed operation; and
a data access mechanism configured to access said data structure element within said memory using said even data structure address, wherein said programmed operation is an initializing procedure that initializes said data structure element within said data structure at said data structure's first active use.

24. A computer controlled system, having a central processing unit (CPU) and a memory coupled to said CPU, for invoking a programmed operation in response to an initial access of a data structure element contained within a data structure, wherein said system comprises:
an alignment mechanism configured to align said data structure element on an even memory address of said memory, said data structure element located at an even offset within said data structure such that said data structure element can be accessed from said memory using a non-byte access-mode of said CPU;
an access tag mechanism configured to associate a data structure access tag storage with said data structure, said data structure access tag storage initially containing an odd data structure memory address related to said data structure;
a trigger mechanism configured to trigger a trap on said initial access of said data structure element by attempting to access said data structure element in said memory using said non-byte access-mode with said odd data structure memory address and said even offset;
an address conversion mechanism, responsive to the trigger mechanism, configured to convert said odd data structure memory address within said data structure access tag storage to an even data structure address whereby subsequent attempts to access said data structure element using said non-byte access-mode with said even data structure address and said even offset will succeed without triggering said trap;
an invocation mechanism configured to invoke said programmed operation; and
a data access mechanism configured to access said data structure element within said memory using said even data structure address, wherein said data structure element is static class variable in a Java class object and said programmed operation is an initializing procedure that further comprises a class initializer mechanism configured to initialize said static class variable within said Java class object.

25. An apparatus having a central processing unit (CPU) and a memory coupled to said CPU for invoking a programmed operation in response to an initial access of a data structure element contained within a data structure, wherein said apparatus comprises:
an alignment mechanism configured to align said data structure element on an even memory address of said memory, said data structure element located at an even offset within said data structure such that said data structure element can be accessed from said memory using a non-byte access-mode of said CPU;
an access tag mechanism configured to associate a data structure access tag storage with said data structure, said data structure access tag storage initially containing an odd data structure memory address related to said data structure;
a trigger mechanism configured to trigger a trap on said initial access of said data structure element by attempting to access said data structure element in said memory using said non-byte access-mode with said odd data structure memory address and said even offset;

an address conversion mechanism, responsive to the trigger mechanism, configured to convert said odd data structure memory address within said data structure access tag storage to an even data structure address whereby subsequent attempts to access said data structure element using said non-byte access-mode with said even data structure address and said even offset will succeed without triggering said trap;

an invocation mechanism configured to invoke said programmed operation; and a data access mechanism configured to access said data structure element within said memory using said even data structure address, wherein said programmed operation is an initializing procedure that initializes said data structure element within said data structure at said data structure's first active use.

26. An apparatus having a central processing unit (CPU) and a memory coupled to said CPU for invoking a programmed operation in response to an initial access of a data structure element contained within a data structure, wherein said apparatus comprises:

an alignment mechanism configured to align said data structure element on an even memory address of said memory, said data structure element located at an even offset within said data structure such that said data structure element can be accessed from said memory using a non-byte access-mode of said CPU;

an access tag mechanism configured to associate a data structure access tag storage with said data structure, said data structure access tag storage initially containing an odd data structure memory address related to said data structure;

a trigger mechanism configured to trigger a trap on said initial access of said data structure element by attempting to access said data structure element in said memory using said non-byte access-mode with said odd data structure memory address and said even offset;

an address conversion mechanism, responsive to the trigger mechanism, configured to convert said odd data structure memory address within said data structure access tag storage to an even data structure address whereby subsequent attempts to access said data structure element using said non-byte access-mode with said even data structure address and said even offset will succeed without triggering said trap;

an invocation mechanism configured to invoke said programmed operation; and a data access mechanism configured to access said data structure element within said memory using said even data structure address, wherein said data structure element is a static class variable in a Java class object and said programmed operation is an initializing procedure that further comprises a class initializer mechanism configured to initialize said static class variable within said Java class object.

27. A computer program product comprising:

a computer usable storage medium having computer readable code embodied therein for invoking a programmed operation in response to an initial access of a data structure element contained within a data structure, said computer readable code comprising:

computer readable code configured to cause said computer to effect an alignment mechanism configured to align said data structure element on an even memory address of said memory, said data structure element located at an even offset within said data structure such that said data structure element can be accessed from said memory using a non-byte access-mode of said CPU;

computer readable code configured to cause said computer to effect an access tag mechanism configured to associate a data structure access tag storage with said data structure, said data structure access tag storage initially containing an odd data structure memory address related to said data structure;

computer readable code configured to cause said computer to effect a trigger mechanism configured to trigger a trap on said initial access of said data structure element by attempting to access said data structure element in said memory using said non-byte access-mode with said odd data structure memory address and said even offset;

computer readable code configured to cause said computer to effect an address conversion mechanism, responsive to the trigger mechanism, configured to convert said odd data structure memory address within said data structure access tag storage to an even data structure address whereby subsequent attempts to access said data structure element using said non-byte access-mode with said even data structure address and said even offset will succeed without triggering said trap;

computer readable code configured to cause said computer to effect an invocation mechanism configured to invoke said programmed operation; and computer readable code configured to cause said computer to effect a data access mechanism configured to access said data structure element within said memory using said even data structure address, wherein said programmed operation is an initializing procedure that initializes said data structure element within said data structure at said data structure's first active use.

28. A computer program product comprising:

a computer usable storage medium having computer readable code embodied therein for invoking a programmed operation in response to an initial access of a data structure element contained within a data structure, said computer readable code comprising:

computer readable code configured to cause said computer to effect an alignment mechanism configured to align said data structure element on an even memory address of said memory, said data structure element located at an even offset within said data structure such that said data structure element can be accessed from said memory using a non-byte access-mode of said CPU;

computer readable code configured to cause said computer to effect an access tag mechanism configured to associate a data structure access tag storage with said data structure, said data structure access tag storage initially containing an odd data structure memory address related to said data structure;

computer readable code configured to cause said computer to effect a trigger mechanism configured to trigger a trap on said initial access of said data structure element by attempting to access said data structure element in said memory using said non-byte access-mode with said odd data structure memory address and said even offset;

computer readable code configured to cause said computer to effect an address conversion mechanism, responsive to the trigger mechanism, configured to convert said odd data structure memory address within said data structure access tag storage to an even data structure address whereby subsequent attempts to access said data structure element using said non-byte access-mode with said even data structure address and said even offset will succeed without triggering said trap;

computer readable code configured to cause said computer to effect an invocation mechanism configured to invoke said programmed operation; and computer readable code configured to cause said computer to effect a data access mechanism configured to access said data structure element within said memory using said even data structure address, wherein said data structure element is a static class variable in a Java class object and said programmed operation is an initializing procedure that further comprises computer readable code configured to cause said computer to effect a class initializer mechanism configured to initialize said static class variable within said Java class object.

29. A computer controlled method for invoking a programmed operation on a data structure responsive to a first active use of said data structure, said method comprising:

causing a misaligned memory access fault;

associating a data structure access tag storage with said data structure, said data structure access tag storage initially containing said misaligned memory address related to said data structure;

requiring a memory access operation to be performed using a memory access mode which requires a memory address in a first address sense, and attempting memory access at a memory address in a second memory sense;

triggering a trap on said first active use of said data structure by attempting to access said data structure using said misaligned memory address with an aligned memory access-mode; and converting said misaligned memory address within said data structure access tag storage from the first memory sense to the second memory sense to an aligned memory address whereby subsequent attempts to access said data structure using said aligned memory access-mode and contents of said data structure access tag storage will succeed without triggering said trap as a result of the memory address being in the second memory sense.

30. The computer controlled method of claim 29 further comprising aligning said data structure at said aligned memory address such that said data structure can be accessed using said aligned memory access-mode and contents of said data structure access tag storage.

31. The computer controlled method of claim 29 further comprising:

invoking said programmed operation; and accessing said data structure using said aligned memory address and said aligned memory access-mode.

32. The computer controlled method of claim 31 whereby said aligned memory address in the first memory sense is an even memory address and said misaligned memory address in the second memory sense is an odd memory address.

* * * * *